ABSTRACTvalve housing is provided with open ends adapted to connect to a fluid conduit and a valve assembly receiving opening that is generally circular in cross section. The valve assembly includes a spherically shaped closure member or gate adapted to control the fluid flow in the conduit and having a hole disposed therethrough, and a seating member or jacket encapsulates the closure member and has a plurality of holes disposed therein which align with the hole in the closure member when the latter is in either an open or a closed position.

United States Patent

Nelson et al.

[15] 3,648,723

[45] Mar. 14, 1972

[54] VALVE

[72] Inventors: Donald R. Nelson; Robert C. Zakaitis; Joseph V. Parent, all of Worcester, Mass.

[73] Assignee: Goddard Industries, Inc., Worcester, Mass.

[22] Filed: Dec. 22, 1969

[21] Appl. No.: 886,854

[52] U.S. Cl............................137/454.6, 251/315, 251/316, 251/317
[51] Int. Cl.............................................F16k 5/06
[58] Field of Search....................137/454.2, 454.6; 251/315, 251/316, 317

[56] References Cited

UNITED STATES PATENTS

| 2,864,580 | 12/1958 | Lemoine | 251/317 |
| 3,167,086 | 1/1965 | Michalski | 137/454.6 X |
| 3,168,900 | 2/1965 | Hansen | 137/454.6 |
| 3,192,943 | 7/1965 | Moen | 137/454.6 X |
| 3,192,948 | 7/1965 | Anderson | 137/454.6 |
| 3,223,111 | 12/1965 | Anderson | 137/454.6 |
| 3,276,740 | 10/1966 | Clark | 251/315 |

FOREIGN PATENTS OR APPLICATIONS

| 725,495 | 1/1966 | Canada | 137/454.6 |

Primary Examiner—Harold W. Weakley
Attorney—Wolf, Greenfield & Sacks

[57] ABSTRACT

A valve housing is provided with open ends adapted to connect to a fluid conduit and a valve assembly receiving opening that is generally circular in cross section. The valve assembly includes a spherically shaped closure member or gate adapted to control the fluid flow in the conduit and having a hole disposed therethrough, and a seating member or jacket encapsulates the closure member and has a plurality of holes disposed therein which align with the hole in the closure member when the latter is in either an open or a closed position.

6 Claims, 3 Drawing Figures

PATENTED MAR 14 1972
3,648,723
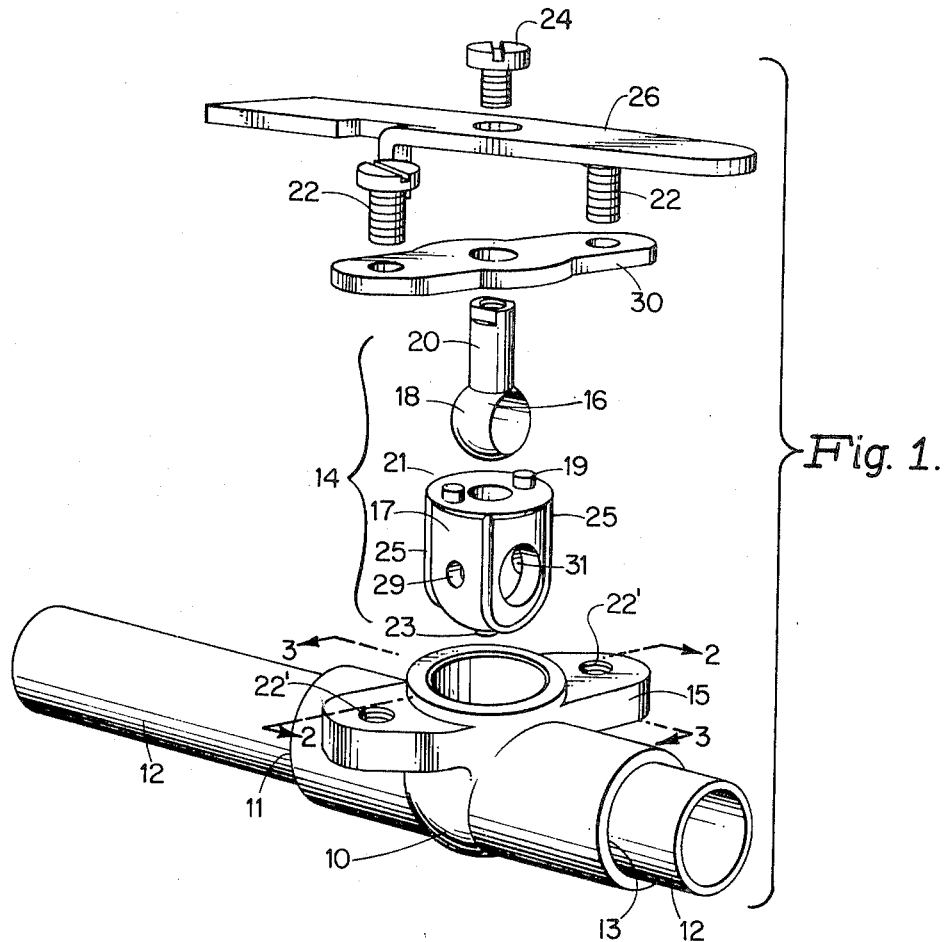
Fig. 1.
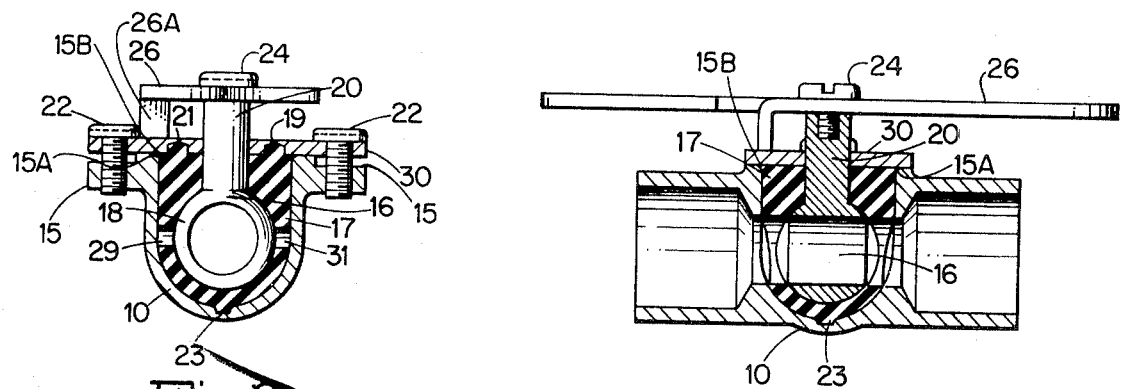
Fig. 2.
Fig. 3.
INVENTORS
DONALD R. NELSON
ROBERT C. ZAKAITIS
JOSEPH VICTOR PARENT
Wolf, Greenfield, Hieken & Sacks
ATTORNEYS

VALVE

BACKGROUND OF THE INVENTION

The present invention pertains generally to a fluid control valve, and in more particular, is concerned with a spheroidal type valve device.

One known valve assembly includes a closure member having a hole disposed through its spherically-shaped portion and a resilient seating member surrounding the latter. When the closure member is in a first (open) position, holes are so provided in the stationary rubber jacket that the hole in the closure member aligns therewith and allows the flow of fluid within the fluid conduit. In a second (closed) position, the closure member is rotated so that the center axis of the hole in the closure member is substantially perpendicular to the axis of the fluid conduit, thereby preventing fluid flow within the fluid conduit. These valves, although successfully used, have suffered from certain drawbacks.

For example, when the valve is in the closed position, the hydrostatic pressures within the valve assembly cause the rubber which covers the hole in the closure member to collapse. This makes it extremely difficult subsequently to turn the closure member from a closed to an open position. An attendant shearing of the rubber sleeve and consequent valve damage may occur. Also, continued cyclical pressure from one direction upon the valve assembly tends to cause the rubber jacket to deform and partially flow into the fluid conduit.

SUMMARY OF THE INVENTION

In view of the foregoing disadvantages, it is an object of the present invention to provide an improved valve assembly for use with fluid conduits.

It is a further object of the present invention to provide a valve assembly wherein the closure member can be rotated with ease and without causing excessive wear to the valve assembly.

It is a further object of the present invention to provide a valve assembly having stationary components that are rigidly fixed.

It is still a further object of the present invention to provide a valve assembly that is more reliable in operation than previous ones and yet can be fabricated at less cost.

These and other objects and advantages are attained with the apparatus of the present invention wherein a spheroidal-type valve is provided with a closure member having a hole disposed therein, encapsulated within a fixed resilient seating member, preferably of rubber. In one embodiment, the seating member or jacket includes positioning means adapted to prevent the movement of the jacket within the valve housing when secured therein. In another embodiment, means are provided to allow for the easy rotation of the closure member when secured within the valve housing and surrounded by the stationary seating member.

BRIEF DESCRIPTION OF DRAWINGS

These and other objects of the present invention will be more clearly understood in connection with a detailed description of the drawings in which:

FIG. 1 is an exploded view of a fluid control valve according to the invention.

FIGS. 2 and 3 are cross-sectional views taken along lines 2—2 and 3—3, respectively, of FIG. 1 with the valve in an open position.

DETAILED DESCRIPTION

FIG. 1 depicts one embodiment of the ball valve of the present invention in an exploded view. Valve receiving housing 10 has open ends 11 and 13, which may be fixedly attached to a conventional fluid conduit 12, such as copper pipe, by means of a solder joint, for example, or in any other suitable manner. Valve housing 10 also includes a flange portion 15 having threaded holes 22' disposed therein for receiving and securing the lower ends of bolts 22. The housing is closed by a plate 30 secured by bolts 22. Valve assembly 14 generally includes closure member 16 and seating member 17. Handle 26 is formed with a non-circular opening corresponding to the cross-sectional configuration of the top of stem 20 by which the handle 26 is keyed to the top portion of stem 20. Handle 26 is secured to stem 20 by bolt 24. Handle 26 includes a depending lip or guide 26A, which allows for only 90° movement of handle 26.

Jacket 17 has a pair of U-shaped ridges 25 disposed or formed integrally on it to form a seal. Pins 19 and 21 project upwardly from jacket 17 and mate with recesses in plate 30, as more clearly shown in FIG. 2. Pins 19 and 21 also prevent rotation of jacket 17 within housing 10 and further function as locating pins. The upper periphery of jacket 17 is flared outwardly and is clamped between the lower surface of plate 30 and the periphery of the recess of housing 10. The jacket 17 also has an integrally formed pin 23, which mates with a recess in housing 10 and prevents the movement of the rubber jacket.

Jacket 17 has four holes arranged in aligned pairs disposed in it, three of which can be observed in FIG. 1. One larger pair of holes are parallel to one another with an aligned axis and in turn are substantially aligned with the hole in the spheroidal-shaped base 18 of member 16 when it is in an open position to allow for the flow of fluid through the fluid conduit. The other smaller pair of parallel aligned holes 29, 31 are substantially aligned with the hole in the spheroidal-shaped base 18 of member 16 when it is in a closed position to thereby hydrostatically balance the pressure between the conduit and the hole in base 18, and prevent the rubber jacket 17 from collapsing inward. The four holes within jacket 17, in the illustrated embodiment, are symmetrically separated by 90°. It has been found with such an arrangement, as shown in the drawings, that the thickness of the rubber that is used for jacket 17 can be less than would otherwise be required because of the pressure balancing holes 29, 31, thereby allowing for a smaller overall valve assembly and a reduced product cost.

FIG. 2 is a cross-sectional view taken along line 2—2 of FIG. 1 with the valve assembled and in an open position. The flange 15 of housing 10 includes a mating ridge 15A that contacts plate 30 when the valve assembly is secured in the valve housing 10. Housing 10 also has a recess internally located, as shown in FIG. 2, and adapted to mate with rubber locating pin 23 protruding from jacket 17. As previously mentioned, valve assembly 14 is inserted into valve receiving housing 10, and plate 30 is inserted over stem 20 of member 16, while bolts 22 forceably mate plate 30 to jacket 17 and mating ridge 15A. The pins 19 and 21 mate with holes disposed in flange portion 30, as indicated in FIG. 2.

FIG. 3, which is a cross-sectional view of the valve in an open position, shows the housing 10, jacket 17 and closure member 16, along with handle 26 and plate 30.

Preferably, base 18 of valve 16 is covered with a Teflon film. This minimizes rotational torque and permits easy turning of the closure member and also presents the rubber from adhering to the ball.

Another important feature of the present invention is the annular protrusion or lip 15B, shown in FIGS. 2 and 3. This lip has a triangular cross-section and is integrally formed as part of jacket 17. When plate 30 is tightened against housing 10, ridge 15A of housing 10 is shaped with an annular inner edge that is bevelled to provide an indentation that mates with protrusion 15B. This arrangement functions as a seal and additional means for preventing rotation of sleeve 17.

Having now described one embodiment of the present invention, various other modifications and adaptations will now become apparent to one skilled in the art, all of which are contemplated as falling within the spirit and scope of the present invention as defined by the appended claims.

What is claimed is:

1. In a valve apparatus for controlling fluid flow in a conduit having a valve receiving housing with an entrance opening and an exit opening both of which are formed to communicate with separate conduit sections and also having a valve assembly receiving opening, a valve assembly for insertion into the valve assembly receiving opening comprising;
   a closure member having a base with a passage extending through said base,
   and a jacket constructed of a compressible resilient material having a cavity shaped to receive said closure member for rotation therein,
   said jacket having means forming openings therein which are aligned with the passage in said closure member when said closure member is in an open position,
   said jacket having an outer surface and including means defining a ridge protruding from said outer surface,
   wherein said protruding ridge is substantially U-shaped and extends about the bottom edge defining said opening.
2. In a valve apparatus in accordance with claim 1 wherein said closure member includes a stem extending from said base and further comprising securing means positioned over the stem and adapted to secure said valve assembly in said valve receiving housing.
3. In a valve apparatus in accordance with claim 2 wherein said jacket includes protruding pins and wherein said securing means has recesses therein adapted to mate with the pins of said jacket,
   and wherein said jacket includes a positioning pin at the bottom thereof and said housing has a recess therein adapted to mate with the positioning pin of said jacket.
4. In a valve apparatus in accordance with claim 1 wherein said jacket includes a pair of oppositely disposed holes aligned orthogonally to said openings.
5. In a valve apparatus in accordance with claim 1 wherein said jacket has an entirely closed bottom wall.
6. In a valve apparatus in accordance with claim 5 wherein said bottom wall is arcuate.

* * * * *